March 22, 1932.  A. J. N. DUCLOS  1,850,581
APPARATUS FOR SEALING CONDUCTORS UNDER PRESSURE
Filed May 26, 1926
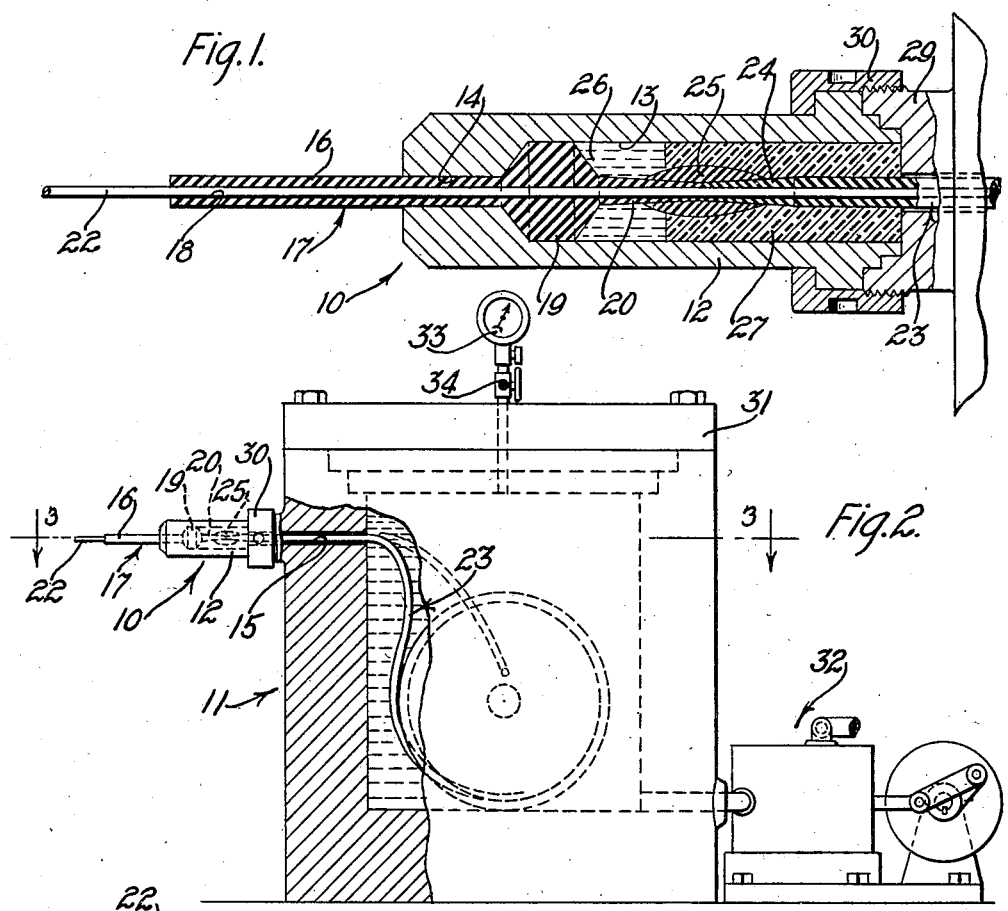
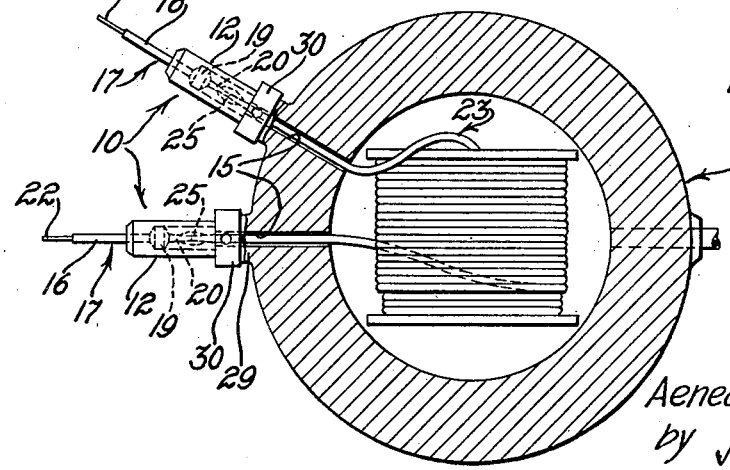
Inventor
Aeneas J. N. Duclos
by  Att'y.

Patented Mar. 22, 1932

1,850,581

UNITED STATES PATENT OFFICE

AENEAS JOSEPH NORBERT DUCLOS, OF RIVER FOREST, ILLINOIS, ASSIGNOR TO WESTERN ELECTRIC COMPANY, INCORPORATED, OF NEW YORK, N. Y., A CORPORATION OF NEW YORK

APPARATUS FOR SEALING CONDUCTORS UNDER PRESSURE

Application filed May 26, 1926. Serial No. 111,714.

This invention relates to apparatus for sealing members under pressure, and more particularly to methods of and apparatus for use in connection with members subjected to high hydro-static pressures.

It is the practice in some instances to subject materials to very high degrees of hydrostatic pressures for the purpose of experimentation, testing and the like. Thus, for example, in the art of producing submarine cables, completed cables are subjected to various tests such as for the purpose of measuring insulation resistance, capacitance, and power factor under deep sea conditions. In order to successfully practice these methods, the cable must be immersed within a contained body of water and be subjected therein to pressures approximating those occasioned at great sea depths. The terminals of the cable thus treated must necessarily be positioned externally of the body of water in order that they may be readily accessible for connection with testing apparatus, and the portion of the cable which extends through the wall of the pressure tank in which the body of water is retained must be effectively sealed.

An object of this invention is to provide a simple and effective method of and apparatus for producing a seal capable of withstanding high and widely varying pressure conditions.

In order to attain this and other objects and in accordance with the general features of the invention, the invention may readily be practiced by employing a sealing device which is adapted for detachable application to the wall of a pressure tank. A coil of cable is immersed within a body of water retained by the tank and a hydraulic pump mechanism associated therewith is employed to establish the required pressure. The sealing device comprises a coupling member formed with a packing chamber and has a tubular insulating member associated therewith. One end of the insulating member is seated within the chamber and a terminal of the cable may be inserted within the chamber and through the insulating member. A wiped joint or bond of suitable material forms a seal between the cable terminal and the insulating member, and a fluid substance together with a plastic packing substance completely fills the chamber. The sealing device may be coupled with the pressure tank and the pressure subsequently created therein.

These and other objects will appear from the following detailed description and the accompanying drawings illustrating one embodiment of the invention and in which Fig. 1 is a central longitudinal sectional view of a sealing device shown in association with a conductor terminal and applied to the wall of a pressure tank;

Fig. 2 is a side elevational view of the pressure tank having the sealing device attached thereto, the pressure tank being shown partly in section, and Fig. 3 is a horizontal sectional view of the pressure tank and associated sealing devices taken on the line 3—3 of Fig. 2.

Referring now to the drawings wherein like numerals are employed to designate similar parts throughout the various disclosures, a pair of sealing devices each denoted generally by the numeral 10 are designed for detachable application to the wall of a suitable pressure tank 11 and serve as a means for terminating the conductor ends of the cable outside the testing tank. Both of the sealing devices 10 consist of the same type of construction as they are both designed to receive either end of the same continuous conductor. A detailed description of one of the devices is therefore believed to be sufficient, and accordingly the same numerals have been employed for similar parts in the two devices. Each sealing device 10 comprises a cylindrical coupling member 12 formed with a packing chamber 13 which terminates at its outer extremity in a reduced opening 14 for accommodating a shank portion 16 of an elongated insulating member 17. This insulating member 17 is provided with an elongated aperture 18 and is formed with an enlarged head portion 19 and a tapered tip 20. The head 19 may be seated or lodged within the packing chamber 13 at the outer end thereof.

The core or conductor terminals 22 of a cable 23 coiled within the pressure tank 11 may be threaded through openings 15 in the wall of the tank 11 and inserted into the elongated aperture 18 of the insulating member 17. In preparing the terminals of the cable for association with the insulating member 17 a portion of its insulation covering 24 is removed so as to expose the bare conductor 22. The remaining end portions of the cable insulation 24 are tapered to conform with the taper of the tip 20 and when the conductor 22 is completely sheathed or inserted within the insulating member 17, the insulation covering 24 will abut the end of the tip 20 and the extremity of the conductor will extend a short distance beyond the outer extremity of the shank 16.

A bond or wiped joint 25 of gutta percha or other suitable material is formed at the junction of the tip 20 and the cable insulation 24 as shown in Fig. 1. When gutta percha is employed it is first softened sufficiently by the application of heat to permit of its being applied at the junction and then worked or wiped along the surfaces of the tip 20 and the tapered portion of the insulation 24 so as to positively prevent the formation of air pockets and thereby present a very effective sealing bond of the type used in joining cables and the like. The shank 16 of the insulating member 17 bearing the conductor 22 may now be inserted into the packing chamber 13 and through the opening 14, the head 19 of the insulating member being carried into seated relationship with respect to the end wall of the chamber 13. A fluid or semi-fluid substance 26 such as an asphalt flux which is adapted to remain in a fluid state under wide variations in temperatures, is introduced within the chamber 13 and positioned about the tapered tip 20 and a plastic or semi-plastic impervious substance 27, such as Chatterton's compound, is placed within the remainder or unfilled portion of the chamber 13 so as to encase the uncovered parts within the chamber. The cylindrical coupling member 12 is seated within a threaded coupling head 29 on the side of the pressure tank 11 and a tightening collar 30 serves to rigidly secure the coupling member 12 in position.

The pressure tank 11 is provided with a cover member 31 which may be suitably secured thereto after the coil of cable 23 has been placed within the tank. A suitable hydraulic pump as indicated by the numeral 32 is employed to establish a fluid pressure within the tank 11 and a pressure gauge 33 in the cover 31 serves to indicate the hydro-static pressure which is established within the tank. Obviously this pressure will tend to force water from within the tank through the openings 15 in the wall of the tank 11 through which the cable 23 passes and this pressure will exert itself against the plastic packing substance 27 within the packing chamber 13. This pressure will cause the plastic substance 27 and the fluid substance 26 to be pressed with an effective sealing face against the walls of the chamber and the contained parts and thereby positively prevent the leakage or seepage of water along the walls of the chamber 13 or along the surface of the cable and associated wiped joint 25. To attain the most satisfactory sealing effect the plastic substance 27 should be such that its expanding and contracting tendencies under varying temperatures will be very slight. It will be clear that if this packing substance experiences any appreciable degree of contraction due to temperatures change, the water might possibly be forced along the walls of the chamber 13 toward the fluid material 26. The fluid material 26 serves to positively preclude the possibility of water being forced from the chamber 13 in the event that moisture should not be completely retained by the packing substance 27. By experimentation it has been found that the above method of sealing when practiced with the use of the disclosed sealing device has enabled the positive sealing of conductors under hydro-static pressure conditions as high as 12,000 pounds per square inch, and this pressure has been maintained over an extended period of time without the slightest degree of leakage.

A valve 34 is associated with the pressure gauge 33 and upon being opened permits the egress of air from the tank 11 while the latter is being filled with water. When the tank is completely filled, the valve 34 is closed and the hydraulic pump mechanism 31 then serves to establish the required degree of pressure within the tank. A Wheatstone bridge or other electrical apparatus may be conveniently connected across the exposed terminals of the conductors 22 for the purpose of determining the functional characteristics of the cable under deep sea conditions.

Although the invention as herein described and illustrated is particularly well adapted for use in connection with the sealing of conductors under pressure, it should be understood that the novel features are capable of other applications and should be limited only by the scope of the appended claims.

What is claimed is:

1. In a device for sealing a conductor under pressure, a packing chamber provided with an opening for receiving the conductor, an insulating element for positioning the conductor within the chamber, a sealing material surrounding adjacent parts of the element and the conductor adhering to and joining them together to prevent leakage of the pressure fluid therebetween and a packing substance sealing the space between the first mentioned sealing material and the walls of the chamber.

2. In a device for sealing a conductor under pressure, a packing chamber through which the conductor may extend, an insulating element substantially closing the outer end of the chamber and having a passage for the conductor, sealing material firmly uniting said element and the conductor and closing said passage and fluid material sealing the joint between the end of the chamber and the insulating member.

3. In a device for sealing an insulated conductor under pressure, a packing chamber through which the conductor may extend, an insulating member having a passage for a portion of the conductor from which the insulation has been stripped and having a tapered sleeve abutting the insulation on the conductor, sealing material forming a wiped joint connecting the tapered sleeve and the insulation on the conductor and additional sealing material to prevent flow of the treating fluid through the packing chamber.

4. In a device for treating an insulated conductor under pressure, a packing chamber through which the conductor may be passed, insulating material forming a continuous fluid-tight sleeve on the conductor and substantially closing the outer end of the packing chamber and fluid packing material filling the outer portion of the chamber to seal the joint between the insulation and the end of the chamber.

5. In a device for treating an insulated conductor under pressure, a packing chamber through which the conductor may pass, an insulator substantially closing the outer end of the chamber and joining with the insulation of the conductor to form a fluid-tight sleeve on the conductor, a fluid packing material filling the outer end of the chamber and a plastic packing material filling the remainder of the chamber.

6. In a device for treating an insulated conductor, a joint comprising a sleeve of hard insulating material and wiped sleeve of insulating material joining the hard material to the ordinary insulation on the conductor.

In witness whereof, I hereunto subscribe my name this 14th day of May A. D., 1926.

AENEAS JOSEPH NORBERT DUCLOS.